United States Patent
Evans et al.

(10) Patent No.: US 9,016,140 B2
(45) Date of Patent: Apr. 28, 2015

(54) VALVE HAVING ROTATABLE VALVE BALL WITH CALIBRATED ORIFICE AND COAXIAL UPSTREAM/DOWNSTREAM PORTS AND ANGLED TAPS TO MEASURE UPSTREAM/DOWNSTREAM PRESSURES FOR FLOW MEASUREMENT

(71) Applicant: Fluid Handling LLC, Morton Grove, IL (US)

(72) Inventors: Stanley P. Evans, Tinley Park, IL (US); Florin Rosca, Niles, IL (US); Glenn E. Huse, Green Oaks, IL (US); Donald A. Kahn, Niles, IL (US)

(73) Assignee: Fluid Handling LLC, Morton Grove, IL (US)

( * ) Notice: Subject to any disclaimer, the term of this patent is extended or adjusted under 35 U.S.C. 154(b) by 124 days.

(21) Appl. No.: 13/681,628

(22) Filed: Nov. 20, 2012

(65) Prior Publication Data

US 2014/0137663 A1 May 22, 2014

(51) Int. Cl.
| | |
|---|---|
| *G01F 1/42* | (2006.01) |
| *G01F 1/44* | (2006.01) |
| *F16K 5/06* | (2006.01) |
| *G01F 1/40* | (2006.01) |
| *G01F 15/00* | (2006.01) |

(52) U.S. Cl.
CPC .. *G01F 1/42* (2013.01); *G01F 1/40* (2013.01); *G01F 1/44* (2013.01); *G01F 15/005* (2013.01); *F16K 5/0605* (2013.01)

(58) Field of Classification Search
None
See application file for complete search history.

(56) References Cited

U.S. PATENT DOCUMENTS

| | | | |
|---|---|---|---|
| 3,209,779 | A | 10/1965 | McGowen, Jr. |
| 3,880,191 | A | 4/1975 | Baumann |
| 4,111,229 | A | 9/1978 | Christian |
| 4,852,610 | A | 8/1989 | McHugh |
| 4,881,718 | A | 11/1989 | Champagne |
| 5,251,148 | A | 10/1993 | Haines et al. |
| 5,560,392 | A | 10/1996 | Spang et al. |
| 6,029,702 | A | 2/2000 | Leinen et al. |
| 6,039,304 | A | 3/2000 | Carlson et al. |
| 6,109,293 | A | 8/2000 | Walrath et al. |
| 6,296,229 | B1 | 10/2001 | Giacomini |
| RE37,617 | E | 4/2002 | Sherman |
| 6,837,480 | B1 | 1/2005 | Carlson |

(Continued)

FOREIGN PATENT DOCUMENTS

DE 3809288 2/1989

OTHER PUBLICATIONS

DE3809288—1 page English Language Abstract.

*Primary Examiner* — Harshad R Patel

(57) ABSTRACT

A valve includes a body having upstream and downstream ports to measure upstream and downstream pressures and configured on a common axis, and a ball arranged in the body to rotate re the common axis between open and closed positions to allow for fluid flow and no fluid flow. The ball has a calibrated member having a calibrated orifice to allow fluid flow and has a flow coefficient and upstream and downstream pressure taps located upstream and downstream of the calibrated orifice and in fluidic communication with the upstream and downstream ports to measure upstream and downstream pressures when in the open position and angled re the common axis, so a direct flow measurement of fluid flow is determined based on a measured pressure differential between upstream and downstream pressure taps re the flow coefficient of the calibrated orifice when in the open position.

20 Claims, 14 Drawing Sheets

(56) References Cited

U.S. PATENT DOCUMENTS

| | | |
|---|---|---|
| 6,843,138 B2 | 1/2005 | Pollard |
| 6,868,741 B2 * | 3/2005 | Harman .................. 73/861.65 |
| 6,915,648 B2 | 7/2005 | Wightman |
| 6,923,074 B2 | 8/2005 | Cipolla et al. |
| 7,363,680 B2 | 4/2008 | Legatt |
| 7,445,025 B2 | 11/2008 | Shafique et al. |
| 7,503,345 B2 | 3/2009 | Paterson et al. |
| 7,549,389 B2 | 6/2009 | Cho et al. |
| 7,828,012 B2 | 11/2010 | Hegberg et al. |
| 2004/0118219 A1 | 6/2004 | Pollard |
| 2009/0032762 A1 | 2/2009 | Junier |
| 2009/0120207 A1 | 5/2009 | Ohtani et al. |

* cited by examiner

Upstream and downstream port sensors 18a, 18b configured to sense upstream and down fluidic pressure of the fluid flow in the valve 10, and providing signaling containing information about the same Signal processor 16 configured to receive the signalling from upstream and downstream pressure tap sensors 18a, 18b and to determine conditions of the fluid flow based at least partly on a measured pressure differential between upstream and downstream pressure taps 18a, 18b in relation to the flow coefficient of the calibrated orifice when the valve ball is substantially in the open position.

Figure 1c

Flow nozzle for Flow Measurement Ball Alternate Configuration

VALVE HAVING ROTATABLE VALVE BALL WITH CALIBRATED ORIFICE AND COAXIAL UPSTREAM/DOWNSTREAM PORTS AND ANGLED TAPS TO MEASURE UPSTREAM/DOWNSTREAM PRESSURES FOR FLOW MEASUREMENT

BACKGROUND OF THE INVENTION

1. Field of the Invention

The present invention relates to a technique for providing a direct flow measurement; and more particularly, the present invention relates to a valve configured for providing a direct flow measurement.

2. Brief Description of Related Art

Presently, most systems where a fluid flows require an isolation valve to shut-off flow and a separate flow measurement device to verify the system flow rate. These additional components in the system take up extra space and increase the head loss. Additionally, significant amounts of extra pipe length may be required depending on the type of flow measurement device being used.

SUMMARY OF THE INVENTION

According to some embodiments, the present invention may take the form of apparatus, such as a valve comprising a valve body in combination with a valve ball.

The valve body may be configured with an upstream port to allow upstream pressure to be sensed and/or measured and a downstream port to allow downstream pressure to be sensed and/or measured, the upstream port and the downstream port being configured in relation to a common axis of the valve.

The valve ball may be configured in the valve body so as to rotate in relation to the common axis and be operable between open and closed positions to allow for fluid flow and non-fluid flow, respectively. The valve ball may also be configured with a calibrated member configured to form a calibrated orifice to allow the fluid flow and having a flow coefficient, an upstream pressure tap located upstream of the calibrated orifice and in fluidic communication with the upstream port in order to measure upstream pressure of the fluid flow when the valve ball is in the open position, and a downstream pressure tap located downstream of the calibrated orifice and in fluidic communication with the downstream port in order to measure downstream pressure of the fluid flow when the valve ball is in the open position, so that conditions of the fluid flow may be determined based at least partly on a measured pressure differential between upstream and downstream pressure taps in relation to the flow coefficient of the calibrated orifice when the valve ball is substantially in the open position.

The present invention may include one or more of the following additional features:

For example, the calibrated orifice may be configured either to have a fixed calibrated inner diameter and integral to the valve ball, or to be assembled as a separate insert.

The upstream pressure tap and the downstream pressure tap may be arranged on opposite sides of the valve ball.

The calibrated orifice may be selected from a group of separate interchangeable orifice inserts that allow different flow rates and conditions to be measured.

The calibrated member forming the calibrated orifice may be a flow nozzle.

The valve may take the form of a positive shut-off displacement valve.

The calibrated member forming the calibrated orifice may include a Venturi or Venturi configuration that is used for flow measurement.

Either the upstream pressure tap is configured to be angled in relation to the common axis, or the downstream pressure tap configured to be angled in relation to the common axis, or both taps are configured to be angled.

The calibrated member may be configured to rotate between closed and open positions, so that the fluid flows through the calibrated orifice when the calibrated member is rotated into the closed position in order to take the direct flow measurement, and so that the fluid flows around the calibrated member when the calibrated member is rotated into the open position and no direct flow measurement is taken.

The apparatus may also include a signal processor that may be configured to receive signalling from upstream and downstream pressure tap sensors containing information about sensed upstream and downstream fluidic pressure of the fluid flow in the valve, and to determine the conditions of the fluid flow based at least partly on the measured pressure differential between the upstream and downstream pressure taps in relation to the flow coefficient of the calibrated orifice when the valve ball is substantially in the open position.

According to some embodiments of the present invention, the apparatus may take the form of a valve system comprising in combination a valve, an upstream pressure tap sensor, and a downstream pressure tap sensor. The valve may include a valve body configured with an upstream port to allow upstream pressure to be sensed and measured and a downstream port and to allow downstream pressure to be sensed and measured. The upstream port and the downstream port may be configured in relation to a common axis. A valve ball may be configured in the valve body so as to rotate in relation to the common axis and be operable between open and closed positions to allow for fluid flow and non-fluid flow, respectively. The valve ball may also be configured with a calibrated member configured to form a calibrated orifice to allow the fluid flow and having a flow coefficient, an upstream pressure tap located upstream of the calibrated orifice in order to measure upstream pressure of the fluid flow when the valve ball is in the open position, the upstream pressure tap being angled in relation to the common axis, and a downstream pressure tap located downstream of the calibrated orifice in order to measure downstream pressure of the fluid flow when the valve ball is in the open position, the downstream pressure tap being angled in relation to the common axis.

The upstream pressure tap sensor may be configured in relation to the upstream pressure tap so as to respond to upstream pressure and providing signaling containing information about the same.

The downstream pressure tap sensor may be configured in relation to the downstream pressure tap so as to respond to downstream pressure and providing a corresponding signal containing information about the same.

The valve system may also include a signal processor configured to receive associated signaling from upstream and downstream pressure tap sensors and to determine conditions of the fluid flow based at least partly on a measured pressure differential between upstream and downstream pressure taps in relation to the flow coefficient of the calibrated orifice when the valve ball is substantially in an open position.

Alternatively, embodiments are also envisioned in which a user is allowed to make a manual calculation of the pressure differential between the upstream and downstream taps, e.g., based at least partly on information contained in the associated signaling received. For example, readings for the upstream and downstream taps may be displayed from the associated signaling received, and the user may make the manual calculation of the pressure differential between the upstream and downstream taps based at least partly on the readings displayed.

One advantage of the present invention is that it provides for a feature that enables direct flow measurement to be obtained through the sealing body or valve ball of a positive shut-off isolation valve in any system where there is fluid flowing. The present invention, which incorporates direct flow measurement in the sealing body or valve ball of the isolation valve reduces the overall amount of components needed in the system, and provides one head loss location when determining overall system head loss requirements, and positive shut-off.

BRIEF DESCRIPTION OF THE DRAWING

The drawing includes the following Figures, not drawn to scale:

FIG. 1c is a diagram of a signal processor that may form part of the apparatus, according to some embodiments of the present invention.

DETAILED DESCRIPTION OF THE INVENTION

Figure 1A:
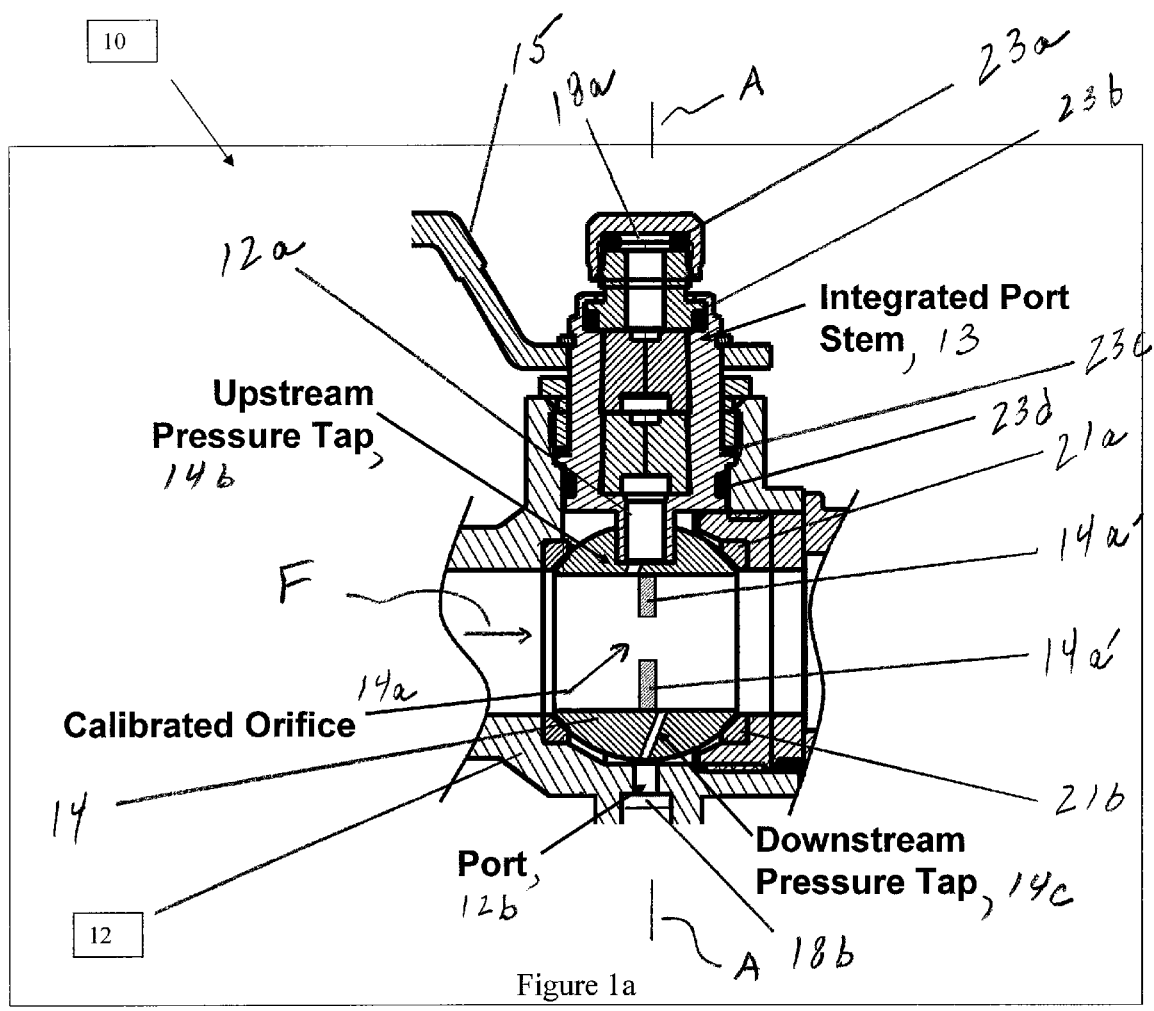
FIG. 1a is a diagram of apparatus in the form of a positive shut-off isolation valve, according to some embodiments of the present invention.
Figure 1B:
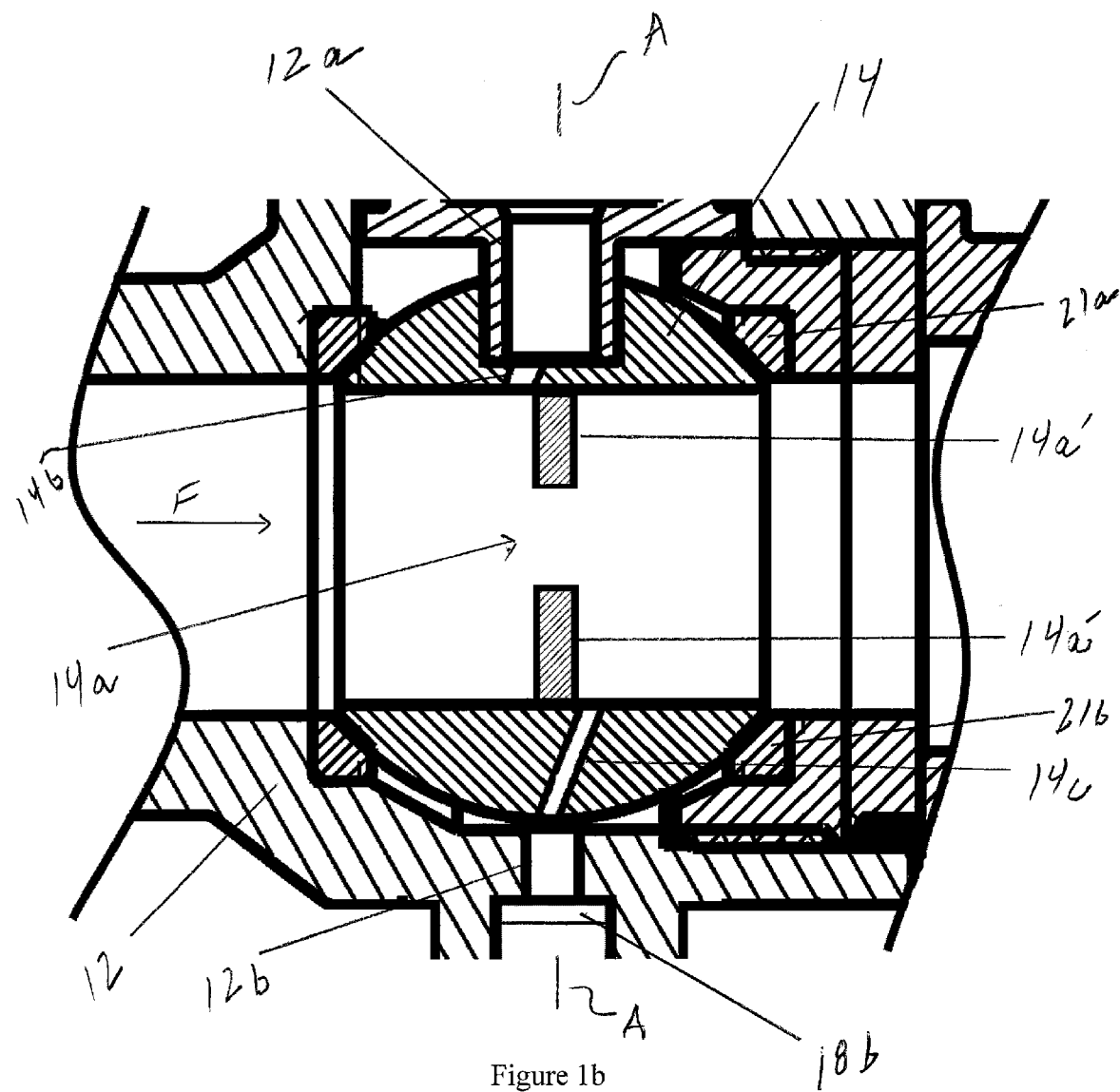
FIG. 1b is a diagram of part of the positive shut-off isolation valve shown in FIG. 1a, according to some embodiments of the present invention.

FIGS. 1a, 1b show the present invention in the form of apparatus 10, such as a valve or a positive shut-off isolation valve, having a valve body 12 in combination with a valve ball 14. The positive shut-off isolation valve 10 also has a handle 15 for turning the valve ball 14 to an open or closed position. In FIGS. 1a, 1b, the valve ball 14 is shown in the open position so that fluid flows through the valve body 14. When the handle 15 is turned or about rotated 90° in either direction, the valve ball 14 would be in the closed position so that there is no fluid flow through the valve body 14.

The valve body 12 may be configured with an upstream port 12a to allow upstream pressure to be sensed and measured and a downstream port 12b to allow downstream pressure to be sensed and measured. The upstream port 12a and the downstream port 12b may be configured in relation to a common axis A.

The valve ball 14 may be configured in the valve body 12 so as to rotate in relation to the common axis A and be operable between the open and closed positions to allow for fluid flow and non-fluid flow, respectively. By way of example, the fluid flow is in the direction indicated by the arrow F. The valve ball 14 may also be configured with a calibrated orifice generally indicated by arrow 14a, an upstream pressure tap 14b and a downstream pressure tap 14c. The calibrated orifice 14a may be configured or formed by a calibration member 14a' that is dimensioned with a central opening to allow the fluid flow F to have a predetermined flow coefficient. The calibration member 14a' may take the form of a ring-like structure, consistent with that shown in FIG. 7b, so that the calibrated orifice 14a takes the form of a central opening that is circular in shape. However, the scope of the invention is intended to include the calibration member 14a' being configured with other types or kinds of structures and with the central opening having other types or kinds of corresponding shapes, including an oval shape, a square shape, a triangular shape, where the shape is based at least partly on the predetermined coefficient flow.

The upstream pressure tap 14b may be located upstream of the calibrated orifice 14a and in fluidic communication with the upstream port 12a in order to sense and measure upstream pressure of the fluid flow F when the valve ball 12 is in the open position. The upstream pressure tap 14b may also be angled in relation to the common axis A, as shown. The downstream pressure tap 14c may be located downstream of the calibrated orifice 14a and in fluidic communication with the downstream port 12b in order to sense and measure downstream pressure of the fluid flow when the valve ball 12 is in the open position. The downstream pressure tap 12b may also be angled in relation to the common axis A, as shown. In operation, conditions of the fluid flow F may be determined based at least partly on a measured pressure differential sensed between upstream and downstream pressure taps 14b, 14c in relation to the predetermined flow coefficient of the calibrated orifice 14a when the valve ball 12 is substantially in the open position and fluid F is flowing through the valve body 14.

In FIG. 1a, the upstream pressure tap 14b is shown as forming part of an integrated port stem assembly 13 that couples the valve ball 14 to the handle 15.

In operation, the integrated port 12a defined through the valve stem assembly 13 and the additional port 12b in the valve body 12 will allow the operator to easily determine the conditions of the fluid flowing through the positive shut-off isolation valve 10, consistent with that set forth herein. The upstream and downstream pressure taps 14a, 14b in the valve ball or sealing body ball 14 will allow internal valve conditions to be measured through the ports 12a, 12b in the valve stem assembly 13 and valve body 12. The valve sealing body ball 14 is operable between the open and closed positions which allow for the fluid flow and non-flow, respectively.

Flow measurement can occur in the valve ball 14 of the isolation valve 10 through the introduction of the calibrated orifice 14a and the pressure taps 14a, 14b. The calibrated orifice 14a may have a fixed calibrated inner diameter and can be integral to, or form part of, a so-called calibrated valve ball 14 of the positive shut-off isolation valve 10, or can be assembled as a separate insert. The pressure taps 14a, 14b may be located immediately upstream and immediately downstream of the calibrated orifice 14a in the valve ball 14 and will be used to measure upstream and downstream pressures, respectively. The integrated port 12a in the integrated port stem assembly 13 is configured to allow the pressure tap 14b to be sensed and measured. The corresponding integrated port 12b opposite the integrated port stem 13 will allow the other pressure tap 14c to be sensed and measured. Flow is determined by applying the measured pressure differential between the upstream and downstream taps in relation to the flow coefficient of the calibrated orifice 14a when the valve ball 14 is in the fully open position. The scope of the invention is intended to include using separate interchangeable orifice inserts to allow different flow rates and conditions to be measured.

The valve 10 may also include upstream and downstream pressure tap sensors 18a, 18b coupled to the upstream and downstream ports 12a, 12b that are configured to sense the fluid pressure and providing signaling containing information about the same for processing by a signal processor 16 shown in FIG. 1c.

The valve 10 in FIGS. 1a and 1b may also include other components that do not form part of the underlying invention, e.g., including upper and lower valve body seals 21a, 21b, O-rings 23a, 23b, 23c, 23d for providing rotational sealing functionality, as well as other components within the integrated port stem that allow it to rotate when the handle is turned, allow the fluid pressure to be provided from the upstream port and sensed and measured. Moreover, to reduce clutter in the drawing, not every element in every figure is labeled.

FIG. 1c

Signal Processor 16

According to the present invention, the apparatus 10 may also include a signal processor 16 shown in FIG. 1c that may be configured to receive signalling from the upstream and downstream pressure tap sensors 18a, 18b (see also FIG. 9) and to determine the conditions of the fluid flow based at least partly on the measured pressure differential between the upstream and downstream pressure taps 14b, 14c in relation to the flow coefficient of the calibrated orifice 14a when the valve ball 14 is substantially in the open position. The signal processor 16 also be configured to provide corresponding signaling containing information about the conditions of the fluid flow based at least partly on the measured pressure differential between the upstream and downstream pressure taps 14b, 14c in relation to the flow coefficient of the calibrated orifice 14a when the valve ball 14 is substantially in the open position. The signal processor 16 may also be configured with a processor and at least one memory device including computer program code, the at least one memory device and the computer program code configured to, with the at least one processor, cause the signal processor at least to implement the signal processing functionality of the apparatus set forth above. A person skilled in the art would understand and appreciate how to implement such a signal processor to perform the aforementioned signal processing functionality without undue experimentation.

By way of example, the functionality of the signal processor 16 may be implemented using hardware, software, firmware, or a combination thereof. In a typical software implementation, the signal processor 16 would include one or more microprocessor-based architectures having at least one microprocessor, random access memory (RAM), read only memory (ROM), input/output devices and control, and data and address buses connecting the same. A person skilled in the art would be able to program such a microcontroller (or microprocessor)-based implementation to perform the functionality described herein without undue experimentation. The scope of the invention is not intended to be limited to any particular implementation using technology either now known or later developed in the future.

FIG. 2

Figure 2:
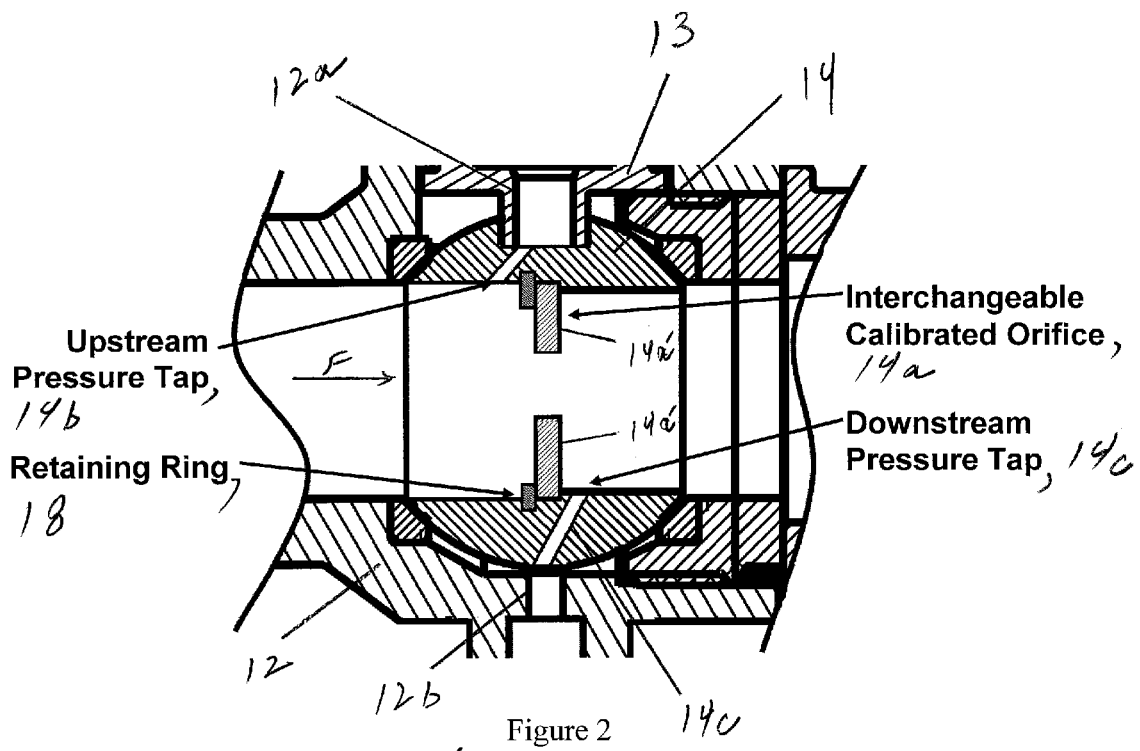
FIG. 2 is a diagram of part of a positive shut-off isolation valve similar to that shown in FIG. 1a having a retaining ring, according to some embodiments of the present invention.

FIG. 2 shows an embodiment of the present invention in which a retaining ring 18 is configured in the valve ball 14 upstream to the calibration member 14a' so as to provide some retaining functionality for the calibration member 14a'. In FIG. 2, similar element to that shown in FIGS. 1a, 1b are provided with similar reference numerals.

FIGS. 3-5

Figure 3:
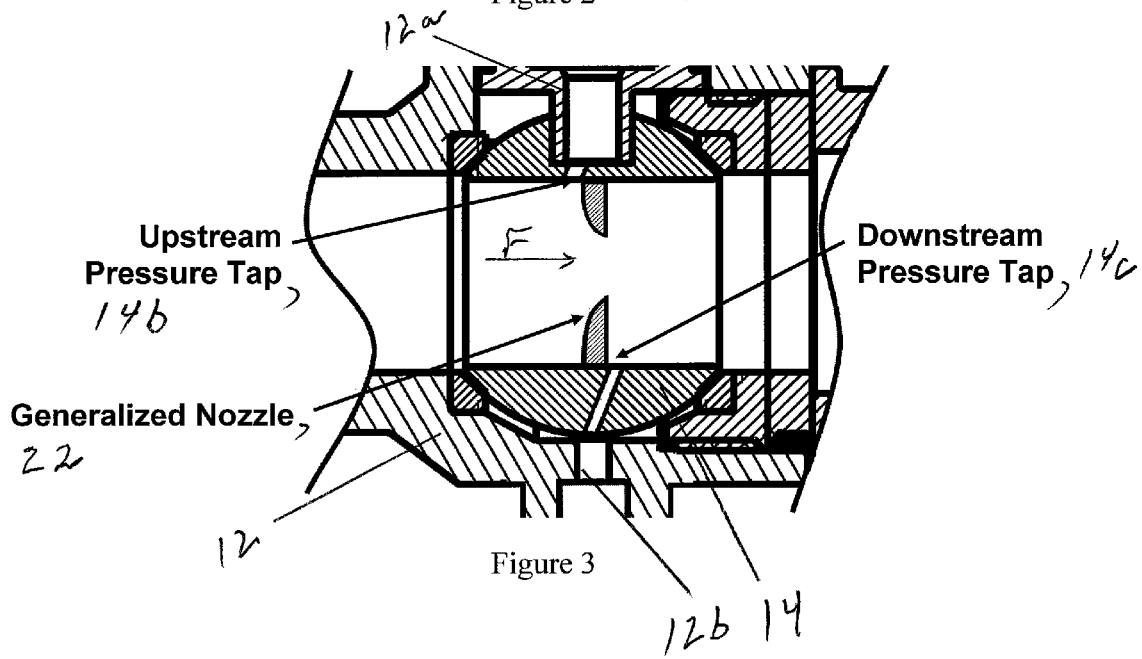
FIG. 3 is a diagram of part of a positive shut-off isolation valve similar to that shown in FIG. 1a, having a generalized nozzle, according to some embodiments of the present invention.
Figure 4:
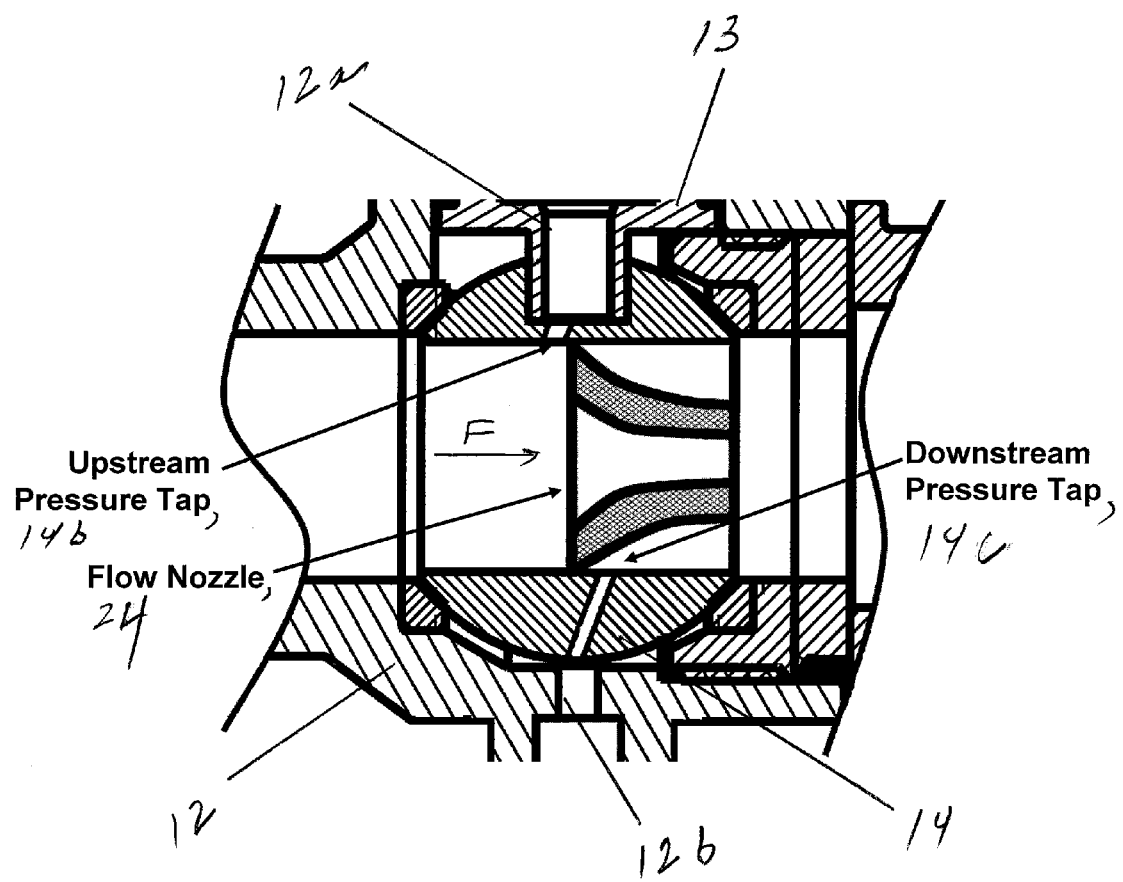
FIG. 4 is a diagram of part of a positive shut-off isolation valve similar to that shown in FIG. 1a, having a flow nozzle, according to some embodiments of the present invention.
Figure 5:
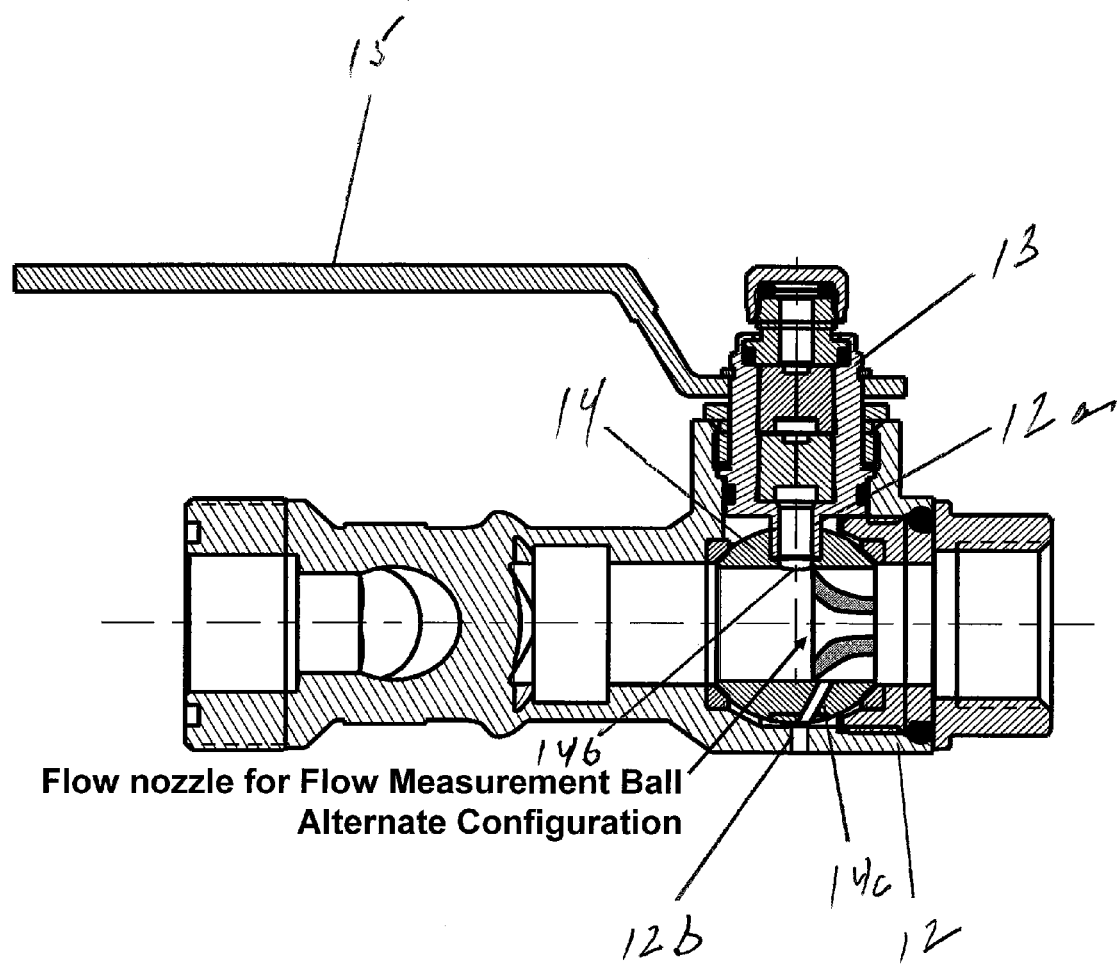
FIG. 5 is a diagram of a positive shut-off isolation valve, having a flow nozzle, according to some embodiments of the present invention.

FIGS. 3-5 show embodiments of the present invention in which a flow measurement through the valve ball 14 of the isolation valve 10 could also occur using a generalized flow nozzle generally indicated as 22 (FIG. 3) in place of the fixed calibrated orifice 14a formed by the calibrated member 14a, or a flow nozzle generally indicated as 24 can also have the same effect. In FIG. 5, the upstream tap 14b is shown in substantial alignment (i.e. not angled) with respect to the upstream port 12a.

In FIGS. 3-5, similar element to that shown in FIGS. 1a, 1b are provided with similar reference numerals.

FIG. 6

Figure 6:
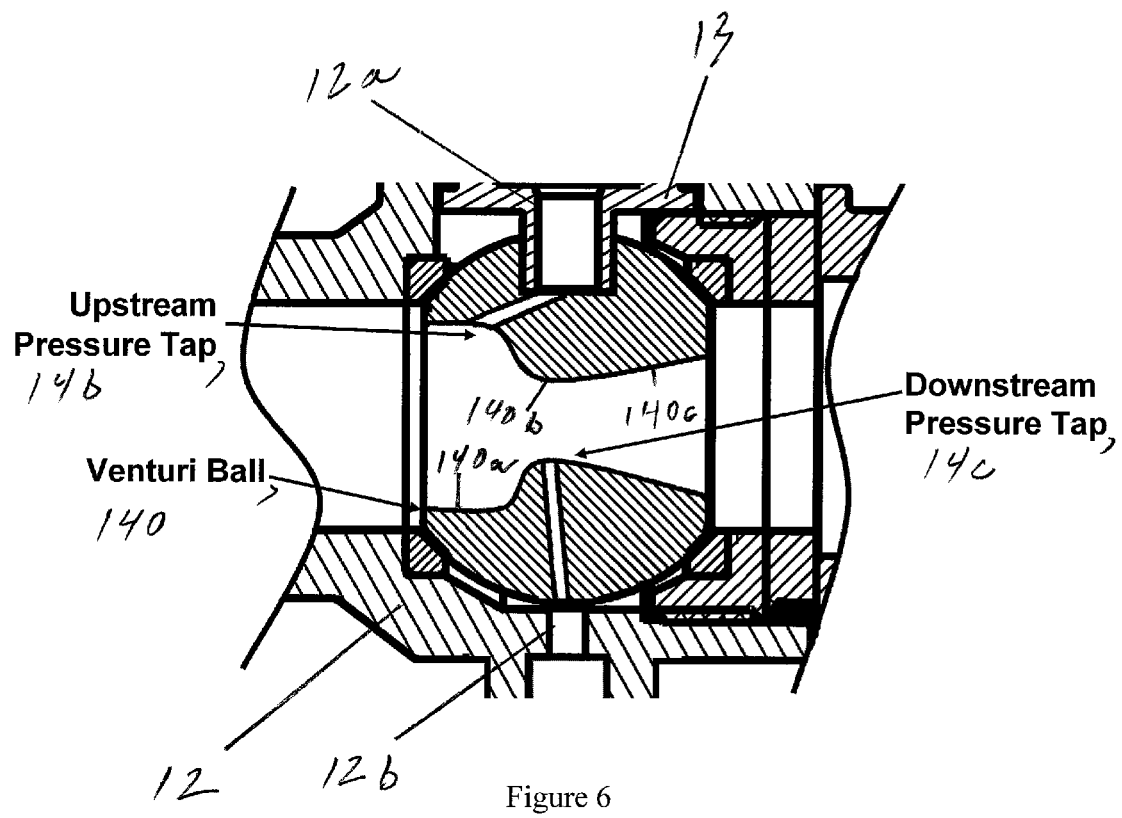
FIG. 6 is a diagram of part of a positive shut-off isolation valve similar to that shown in FIG. 1a, having a Venturi-shaped valve ball, according to some embodiments of the present invention.

FIG. 6 shows an embodiment of the present invention in which a Venturi may be configured in the valve ball 140 could also be used for flow measurement. As shown, the valve ball 140 is configured with three sections 140a, 140b and 140c. Section 140a is a wide section, section 140b is a constricted section relative to the wide section 140a, and section 140c is an intermediate section relative to sections 140a and 140b. The Venturi effect is understood to be a reduction in fluid pressure that results when the fluid flows from the wide section 140a through the constricted section 140b and to the intermediate section 140c of the valve ball 140. Flow would be similarly calculated with the flow coefficient changing to suit the design of the orifice, nozzle, or Venturi configured in the valve ball. The pressure taps 14b, 14c may be configured or arranged in any orientation on the valve ball 140. The design may also be applied to trunnion type ball valves as well, according to some embodiments of the present invention.

FIGS. 7a-7d

Figure 7A:
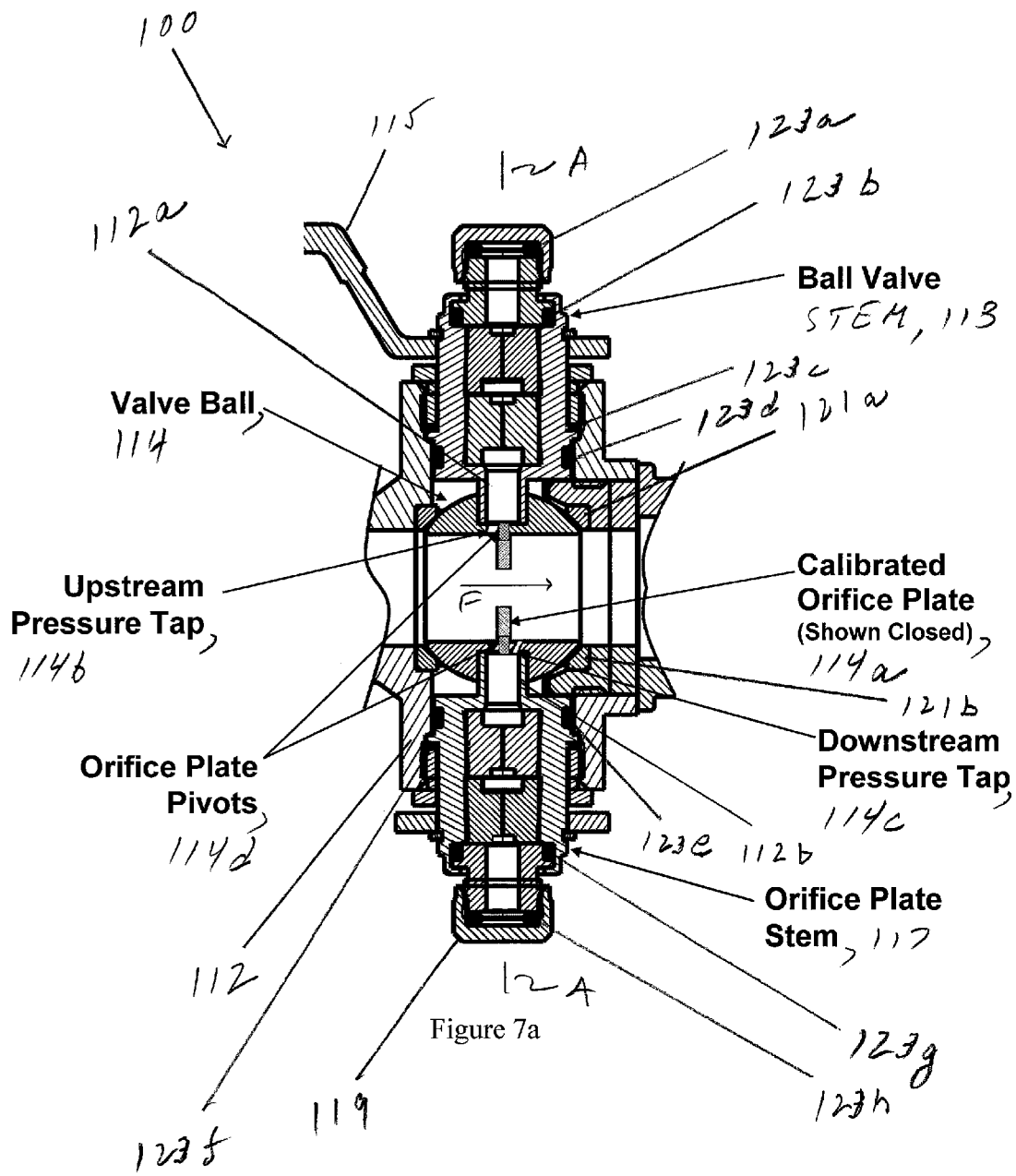
FIGS. 7a to 7d are diagrams of a positive shut-off isolation valve similar to that shown in FIG. 1a, but having a rotating calibrated member or plate, according to some embodiments of the present invention, including FIG. 7a showing a calibrated plate rotated in a closed position for taking a direct flow measurement, FIG. 7b showing a calibrated plate rotated in an open position, FIG. 7c showing flow through the calibrated plate in the closed position in FIG. 7a, and FIG. 7d showing flow around the calibrated plate in the open position in FIG. 7b.
Figure 7B:
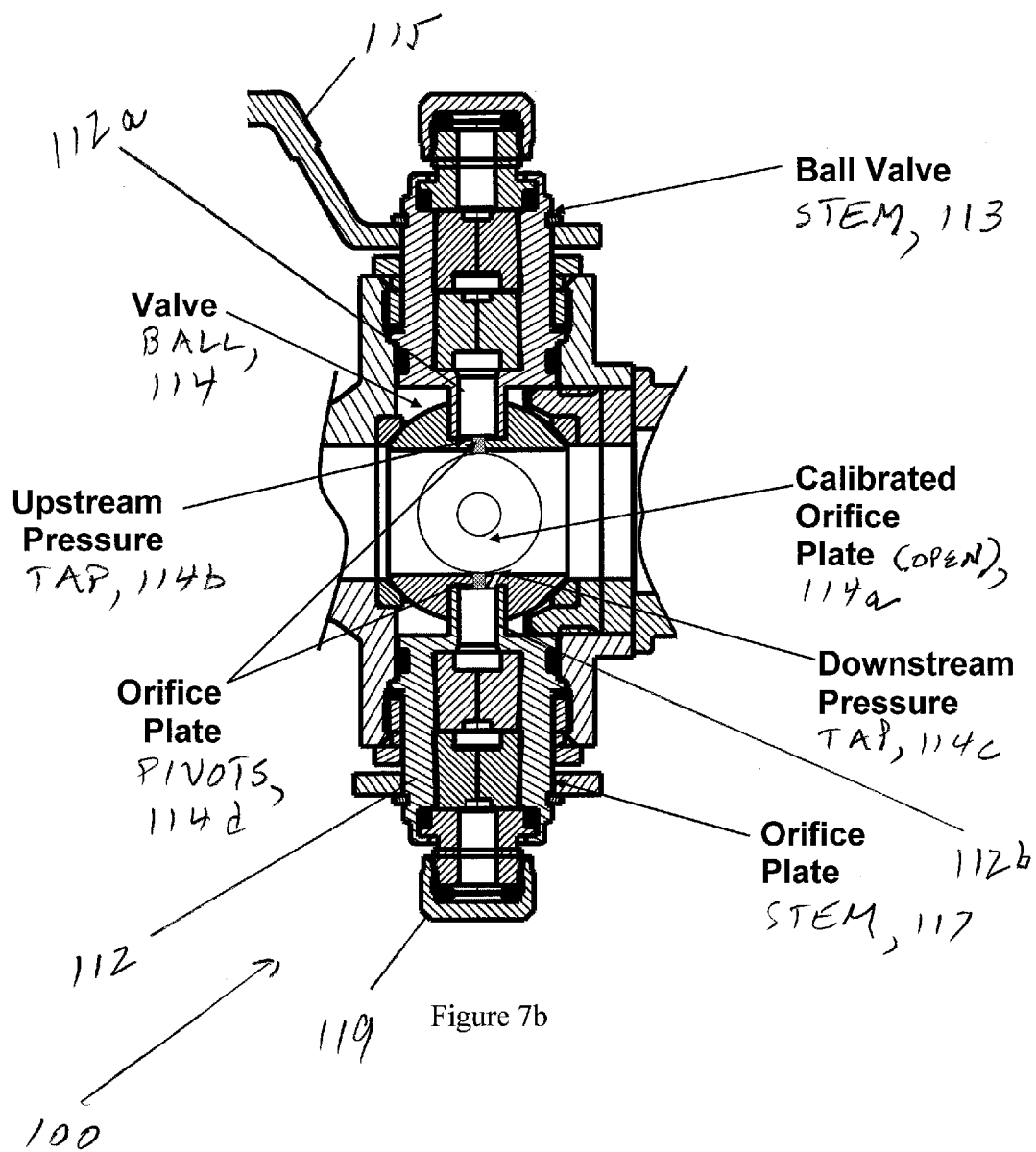
Figure 7C:
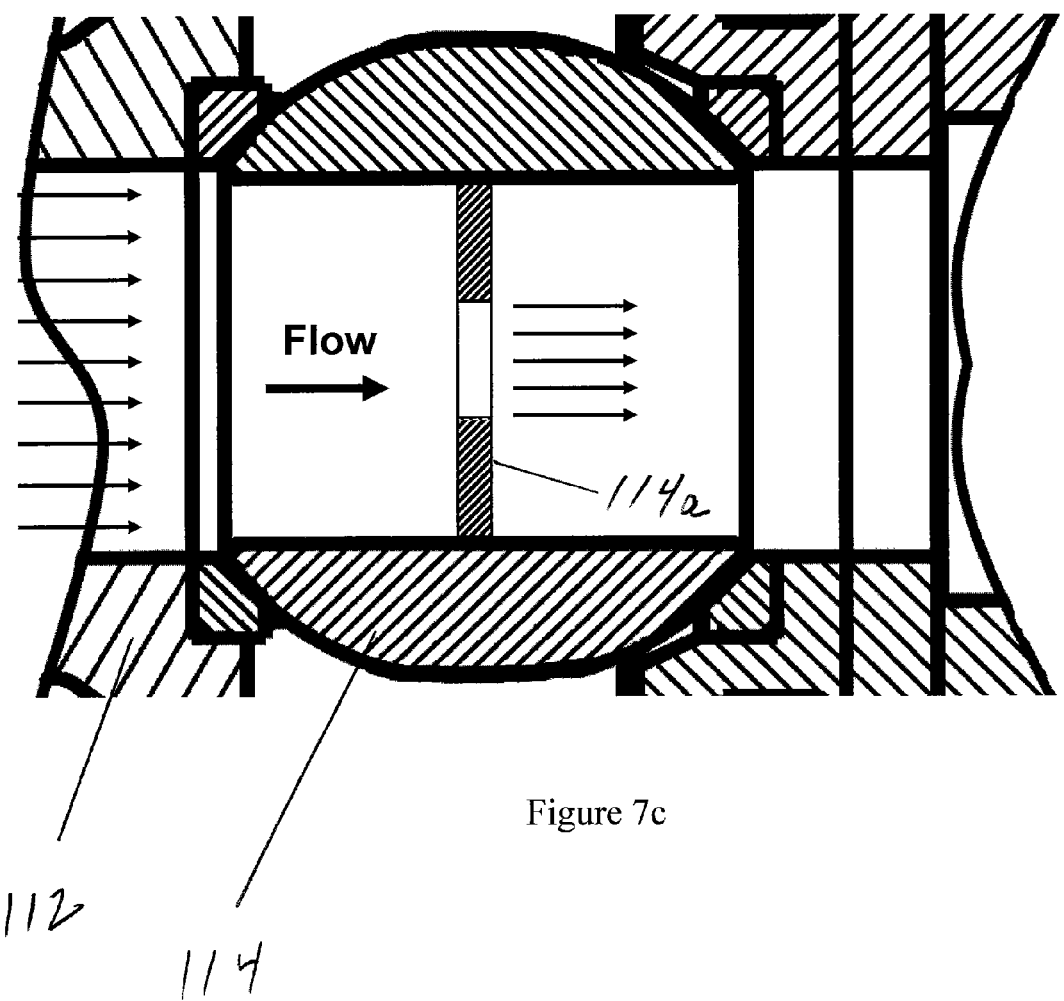
Figure 7D:
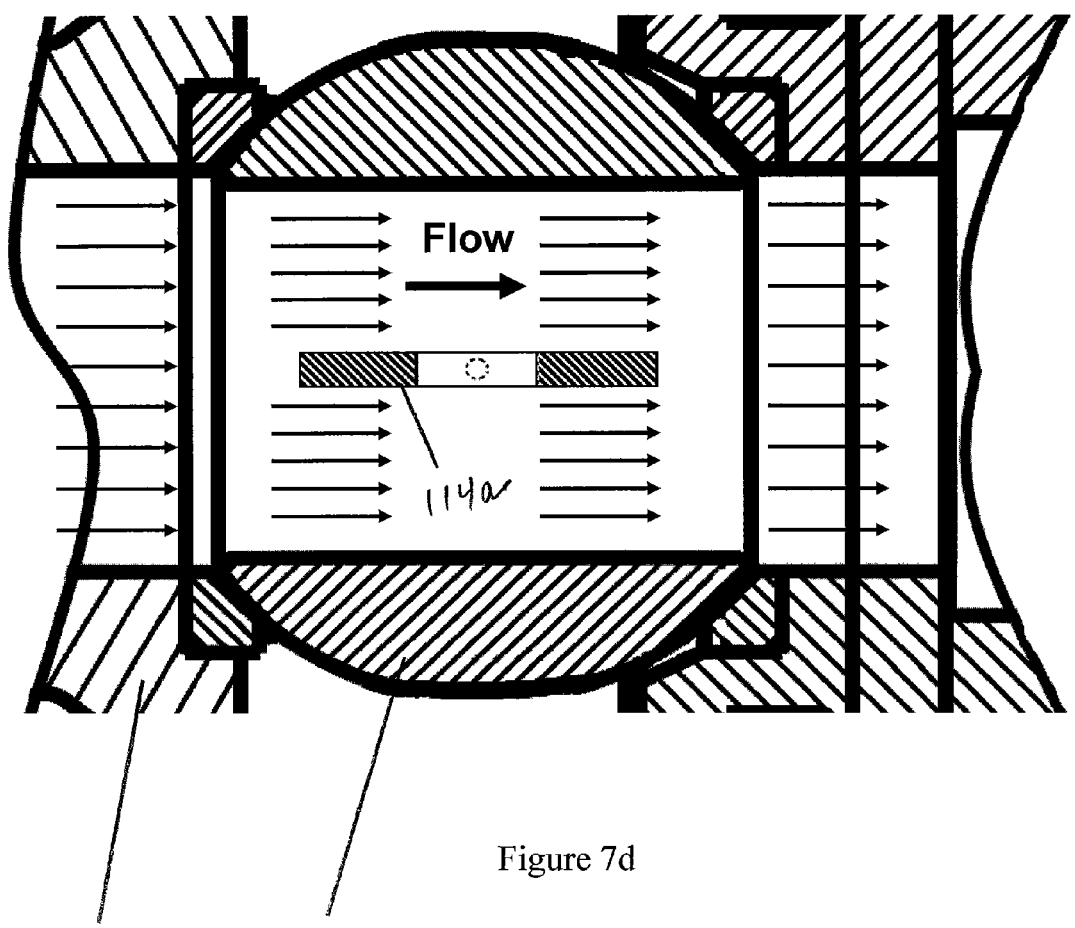

FIGS. 7a-7d show an alternate embodiment of a valve generally indicated as 100 according to the present invention that includes a valve body 112 in combination with a valve ball 114 (aka the or valve sealing body). The valve ball 114 includes a calibrated orifice plate 114a that is used for flow measurement that can be rotated out of the path of flow if desired by the operator. FIGS. 7a and 7c show the calibrated orifice plate 114a in the closed position, while FIGS. 7b and 7d show the calibrated orifice plate 114a in the closed position.

The operator may choose to rotate the orifice plate 114a out of the flow path to increase flow through the valve 100, as shown in FIGS. 7a and 7c; or the operator may choose to rotate the orifice plate 114a into the flow path to use the valve 100 as a momentary means of flow measurement, as shown in FIGS. 7b and 7d. The calibrated orifice plate 114a would be installed in the valve ball 114 via pivots 114d along the same axis A of rotation for the valve ball 114. On one side of the valve 100, a handle 115 may be configured to control the rotation of the valve ball 114. On the other side of the valve 100, a separate handle or dial 119 may be configured to control the rotation of an orifice plate stem 117, which would in turn control the position of the orifice plate 114a. The upstream pressure port 112a required for cooperating with the upstream pressure tap 114b and determining fluid flow may be configured or contained within the integrated ball valve or port stem 113, as shown. The downstream pressure port 112b required for cooperation with the downstream pressure tap 114c for fluid flow measurement may be configured or contained within the orifice plate stem 117, as shown.

The valve 100 in FIGS. 7a to 7c includes other components that do not form part of the underlying invention, e.g., including upper and lower valve body seals 121a, 121b, O-rings 123a, 123b, 123c, 123d, 123e, 123f, 123g, 123h for providing rotational sealing functionality, as well as other components within the integrated port stem that allow it to rotate when the handle is turned, allow the fluid pressure to be provided from the upstream port so as to be sensed and measured.

Figure 8A:
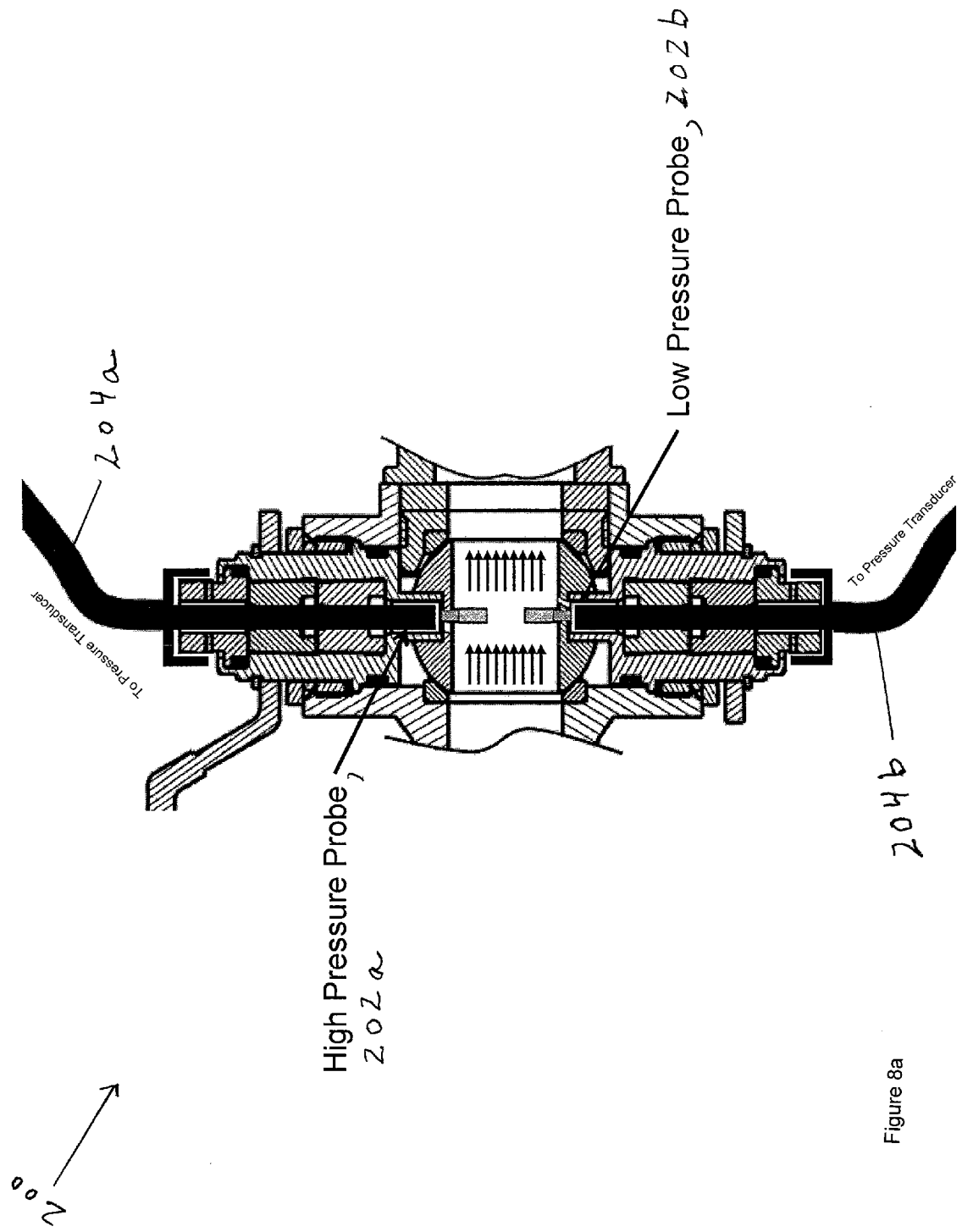
FIG. 8a is a diagram of a valve having high and low pressure probes or probe assemblies arranged therein, according to some embodiments of the present invention.
Figure 8B:
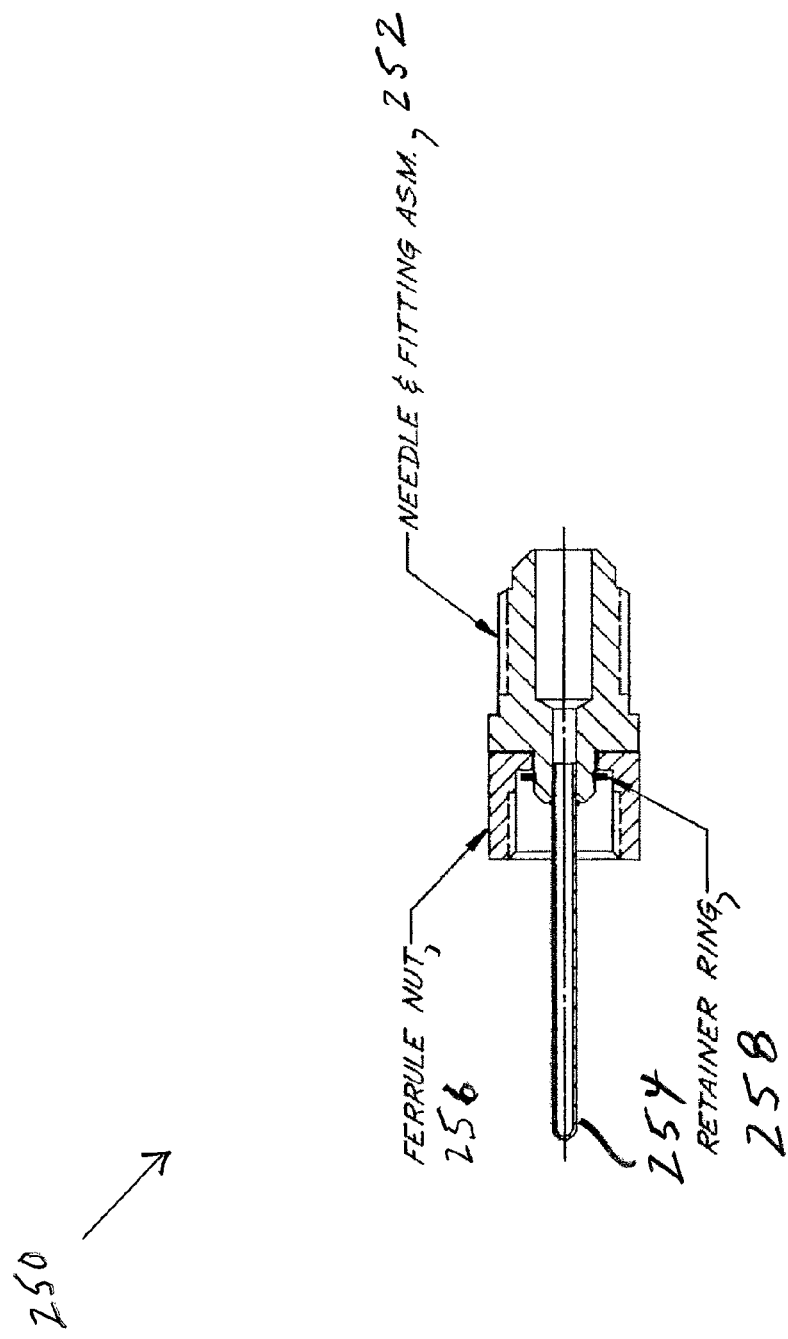
FIG. 8b is a diagram of a pressure probe or probe assembly, according to some embodiments of the present invention.

FIGS. 8a and 8b

FIG. 8a shows a valve generally indicated as 200 having high and low pressure probes or probe assemblies 202a, 202b arranged therein, according to some embodiments of the present invention. The valve 200 has many similar parts or components as the valve 100 shown in FIGS. 7a and 7b. The non-duplicative parts or components in FIG. 8a are labeled and described herein. For example, the high and low pressure probes or probe assemblies 202a, 202b are arranged respectively in relation to ports like 112a, 112b in FIGS. 7a, 7b and have a cable 204a, 204b passing through and from the top and bottom of the valve 200 as shown to a pressure transducer and/or signal processor 280 like that shown in FIG. 9. Embodiments are envisioned in which the cable 204a, 204b is configured as an electronic cable for providing electric signaling to a signal processor like that shown in FIG. 1c or 9. In this type of embodiment, the high and low pressure probes or probe assemblies 202a, 202b may include, or take the form of, some kind of piezoelectric (PZT)-based sensor configured to respond to the fluidic pressure and provide suitable electric signaling containing information about the same. Alternatively, embodiments are envisioned in which the cable 204a, 204b is configured as a hollow cable for providing fluid pressure to a pressure transducer like that shown in FIG. 9, where the fluidic pressure is sensed and measured, and suitable electric signaling is provided containing information about the same for subsequent signal processing.

High and low pressure probes or probe assemblies like elements 202a, 202b are known in the art, and the scope of the invention is not intended to be limited to any particular type or kind thereof either now known or later developed in the future. By way of example, FIG. 8b shows one such pressure probe or probe assembly generally indicated as 250, according to some embodiments of the present invention, having a needle and fitting assembly 252, a hollow probe portion 254 for receiving the fluid flow, a ferrule nut 256, a retainer ring 258 and a channel or passageway 260 in fluidic communication with the hollow probe portion 254 for providing the fluid flow from the pressure probe or probe assembly 250.

FIG. 9

Figure 9:
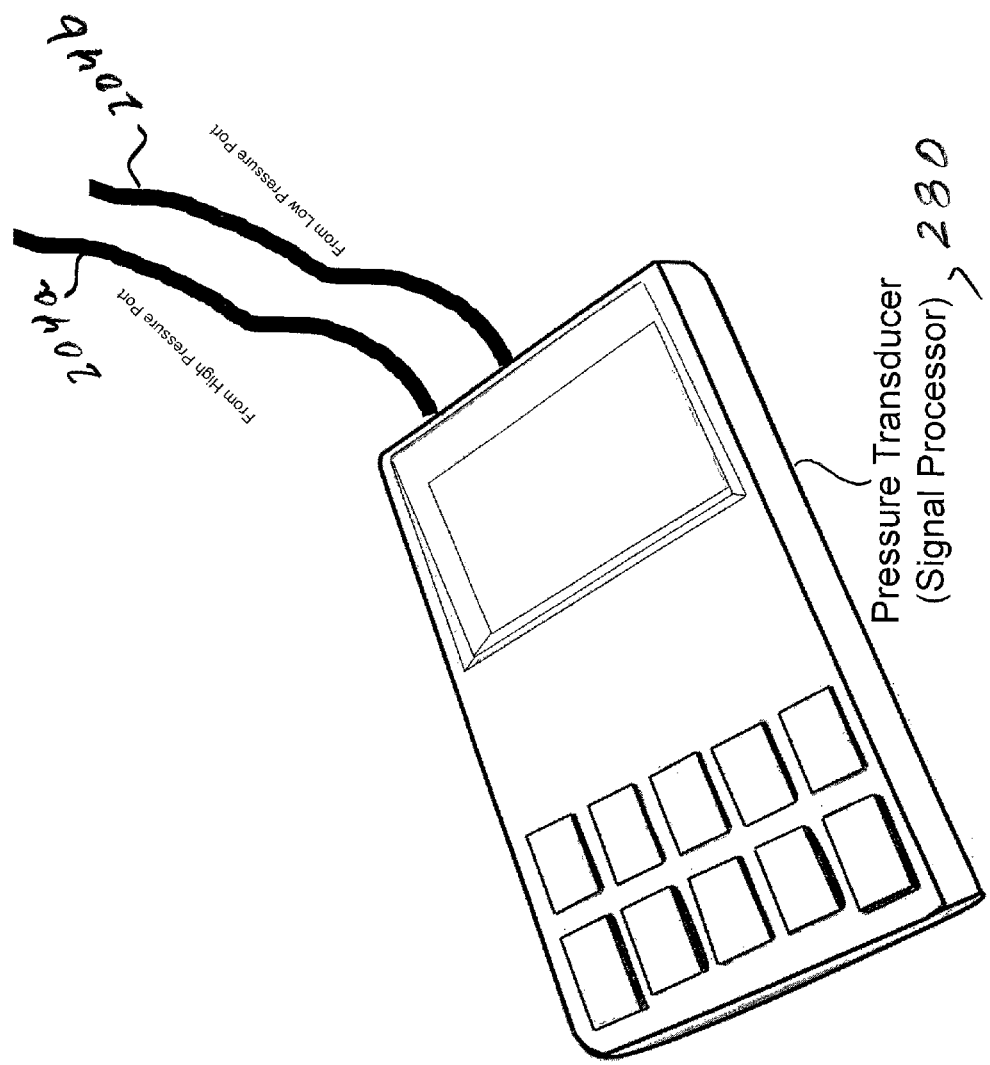
FIG. 9 is a diagram of a pressure transducer and/or signal processor, according to some embodiments of the present invention.

FIG. 9 shows apparatus generally indicated as 180 that may take the form of, or be implemented as, a pressure transducer and/or signal processor, according to some embodiments of the present invention. The apparatus 180 is coupled to the cables 204a, 204b from the valve 200 in FIG. 8a.

In one type of embodiment, the pressure transducer 180 may be implemented so as to respond to the fluidic pressure of the fluid flow, e.g., in the cable 204a, 204b and provide signaling containing information about the same. The signaling would be processed in a manner consistent with that shown, e.g., in FIG. 1c, in order to determine the pressure differential between the high and low pressure probes or probe assemblies 202a, 202b.

Alternatively, in another type of embodiment, the signal processor 180 may take the form of, or be implemented consistent with that shown in FIG. 1c, so as to provide the signal processing functionality to determine the pressure differential between the high and low pressure probes or probe assemblies 202a, 202b.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:
1. Apparatus comprising a valve having:
   a valve body configured with an upstream port to allow upstream pressure to be measured and a downstream port to allow downstream pressure to be measured, the upstream port and the downstream port being configured on a common axis; and
   a valve ball configured in the valve body so as to rotate on the common axis and be operable between open and closed positions to allow for fluid flow and no fluid flow, respectively, and also configured with
      a calibrated member configured to form a calibrated orifice to allow the fluid flow, the calibrated member having a flow coefficient,
      an upstream pressure tap located upstream of the calibrated orifice and in fluidic communication with the upstream port in order to measure upstream pressure of the fluid flow when the valve ball is in the open position, and a downstream pressure tap located downstream of the calibrated orifice and in fluidic communication with the downstream port in order to measure downstream pressure of the fluid flow when the valve ball is in the open position, so that a direct fluid measurement of the fluid flow may be determined based at least partly on signaling containing information about a measured pressure differential between upstream and downstream pressure taps in relation to the flow coefficient of the calibrated orifice when the valve ball is substantially in the open position.

2. Apparatus according to claim 1, wherein the calibrated orifice is configured either to have a fixed calibrated inner diameter and integral to the valve ball, or to be assembled as a separate insert.

3. Apparatus according to claim 1, wherein the upstream pressure tap and the downstream pressure tap are arranged on opposite sides of the valve ball.

4. Apparatus according to claim 1, wherein the calibrated orifice is selected from a group of separate interchangeable orifice inserts that allow different flow rates to be measured.

5. Apparatus according to claim 1, wherein the calibrated member forming the calibrated orifice is a flow nozzle.

6. Apparatus according to claim 1, wherein the calibrated member forming the calibrated orifice includes a Venturi that is used for flow measurement.

7. Apparatus according to claim 1, wherein the valve is a positive shut-off displacement valve.

8. Apparatus according to claim 1, wherein the apparatus comprises upstream and downstream pressure tap sensors configured to respond to fluidic pressure sensed in relation to the upstream and downstream pressure taps and to provide signalling containing information about the fluidic pressure.

9. Apparatus according to claim 8, wherein the apparatus comprises a signal processor configured to receive the signalling from the upstream and downstream pressure tap sensors and to determine the direct flow measurement of the fluid flow based at least partly on the measured pressure differential between the upstream and downstream pressure taps in relation to the flow coefficient of the calibrated orifice when the valve ball is substantially in the open position.

10. Apparatus according to claim 1, wherein either the upstream pressure tap is angled in relation to the common axis, or the downstream pressure tap being angled in relation to the common axis, or both taps are angled.

11. Apparatus according to claim 1, wherein the calibrated member is configured to rotate between closed and open positions, so that the fluid flows through the calibrated orifice when the calibrated member is in the closed position in order to take the direct flow measurement, and so that the fluid flows around the calibrated member when the calibrated member is in the open position and no direct flow measurement is taken.

12. Apparatus comprising a valve system having:
a valve comprising:
a valve body configured with an upstream port to allow upstream pressure to be measured and a downstream port to allow downstream pressure to be measured, the upstream port and the downstream port being configured on a common axis; and a valve ball configured in the valve body so as to rotate on the common axis and be operable between open and closed positions to allow for fluid flow and no fluid flow, respectively, and also configured with a calibrated member configured to form a calibrated orifice to allow the fluid flow, the calibrated member having a flow coefficient, an upstream pressure tap located upstream of the calibrated orifice in order to measure upstream pressure of the fluid flow when the valve ball is in the open position, the upstream pressure tap being angled in relation to the common axis, and a downstream pressure tap located downstream of the calibrated orifice in order to measure downstream pressure of the fluid flow when the valve ball is in the open position, the downstream pressure tap being angled in relation to the common axis;

an upstream pressure tap sensor configured in relation to the upstream pressure tap so as to respond to upstream pressure and providing signaling containing information about the same; and a downstream pressure tap sensor configured in relation to the downstream pressure tap so as to respond to downstream pressure and providing a corresponding signal containing information about the same.

13. Apparatus according to claim 12, wherein the calibrated member forming the calibrated orifice is configured either to have a fixed calibrated inner diameter and integral to the valve ball, or to be assembled as a separate insert.

14. Apparatus according to claim 12, wherein the upstream pressure tap and the downstream pressure tap are arranged on opposite sides of the valve ball.

15. Apparatus according to claim 12, wherein the calibrated member forming the calibrated orifice is selected from a group of separate interchangeable orifice inserts that allow different flow rates to be measured.

16. Apparatus according to claim 12, wherein the calibrated member forming the calibrated orifice is a flow nozzle.

17. Apparatus according to claim 12, wherein the calibrated member forming the calibrated orifice includes a venturi that is used for flow measurement.

18. Apparatus according to claim 12, wherein the valve is a positive shut-off displacement valve.

19. Apparatus according to claim 12, wherein the calibrated member is configured to rotate between closed and open positions, so that the fluid flows through the calibrated orifice when the calibrated member is rotated into the closed position in order to take the direct flow measurement, and so that the fluid flows around the calibrated member when the calibrated member is rotated into the open position and no direct flow measurement is taken.

20. Apparatus according to claim 12, wherein the apparatus comprises a signal processor configured to receive associated signaling from upstream and downstream pressure tap sensors and to determine the direct flow measurement of the fluid flow based at least partly on a measured pressure differential between upstream and downstream pressure taps in relation to the flow coefficient of the calibrated orifice when the valve ball is substantially in the open position.

* * * * *